Patented Aug. 14, 1945

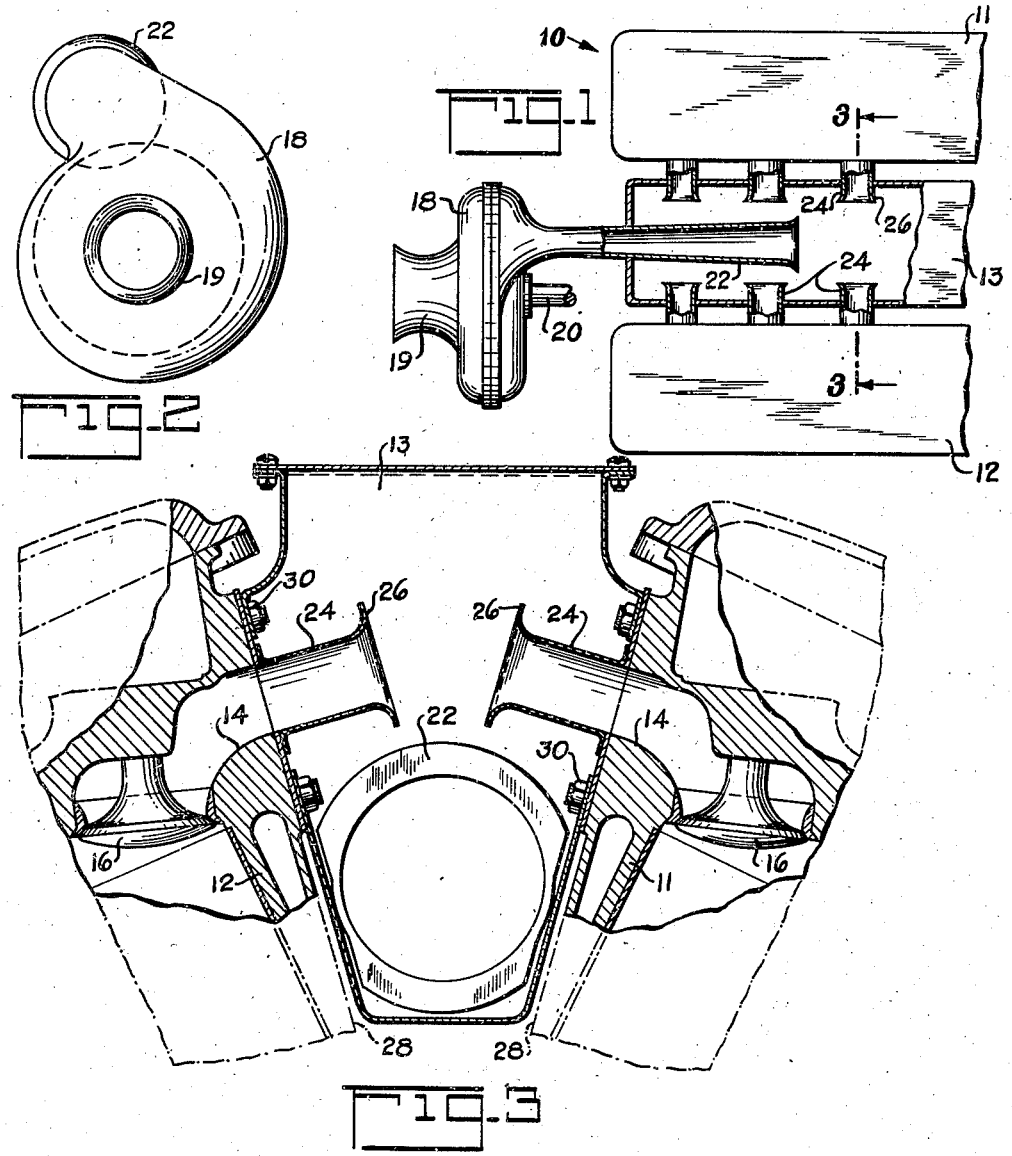

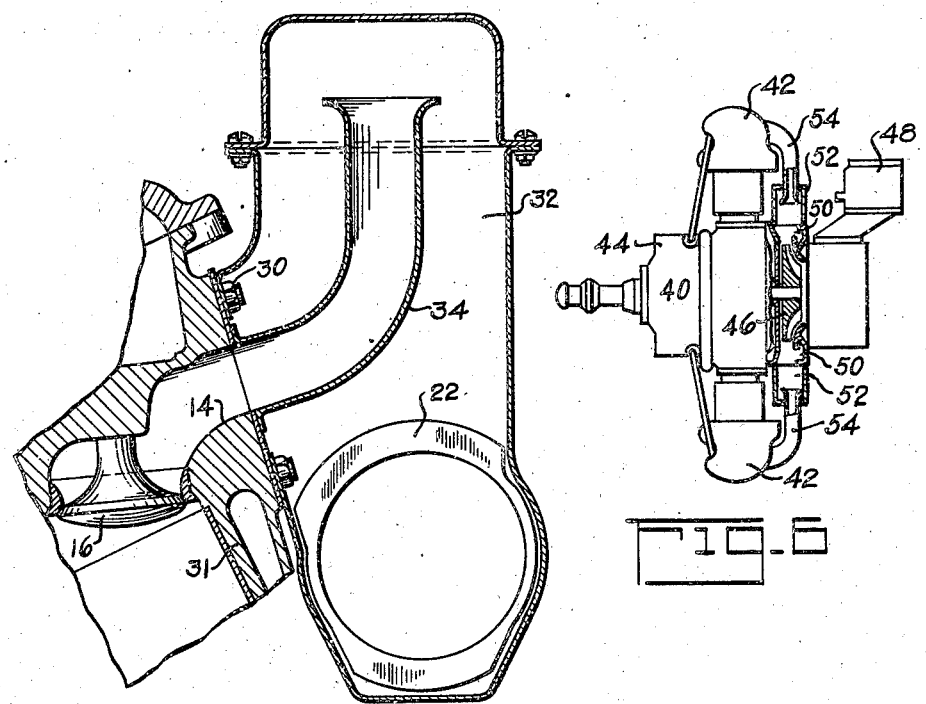
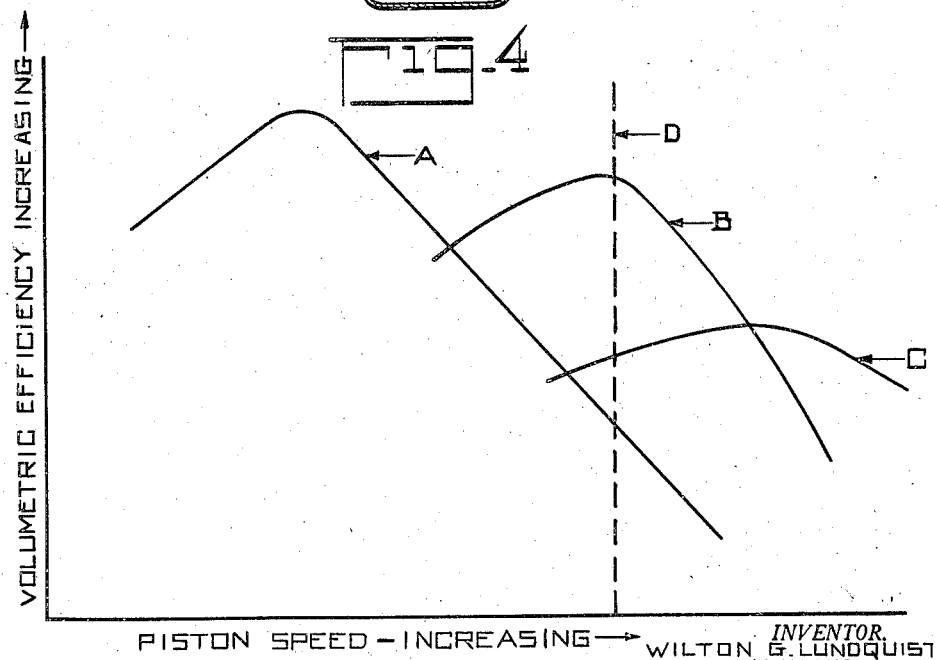

2,382,244

UNITED STATES PATENT OFFICE 2,382,244

INTAKE MANIFOLD ARRANGEMENT

Wilton G. Lundquist, Hohokus, and Elden H. Olson, Paterson, N. J., assignors to Wright Aeronautical Corporation, a corporation of New York Application January 29, 1944, Serial No. 520,348

11 Claims. (Cl. 123—52)

This invention relates to an induction system for an internal combustion engine and is particularly directed to an intake manifold arrangement of the induction system.

It is well known that for a given engine speed there is an optimum length for the intake pipe to the engine cylinders for maximum volumetric efficiency, and that with other conditions constant this optimum pipe length decreases with increasing engine speed. That is, for a given engine speed, the weight of charge that a piston draws into its cylinder varies with the length of the intake pipe and in order for the piston to draw a maximum weight of charge into the cylinder, the intake pipe must be a particular length. Other conditions remaining the same, if the intake pipe is made longer or shorter than this optimum length, the piston will draw less weight of charge into the cylinder on each stroke.

It is an object of this invention to control the effective length of an intake pipe by providing a relatively large manifold from which each of the intake pipes extends to its associated cylinder, the length of the intake pipes being controlled by the extent to which they extend within the manifold. With this construction it is readily possible to provide intake pipes of proper length. Other objects of this invention will become apparent upon reading the annexed detailed description in connection with the drawings in which:

Fig. 1 is a diagrammatic view partly in section of an internal combustion engine embodying the invention, Fig. 2 is an end view of the supercharger, Fig. 3 is a sectional view taken along line 3—3 of Fig. 1, Fig. 4 is a sectional view through a modification, Fig. 5 is a diagrammatic view illustrating the variation of volumetric efficiency of the piston-cylinders of an internal combustion engine with engine speed for various intake pipe lengths, and Fig. 6 is a view partly in section of a further modification.

The volumetric efficiency of each of the piston-cylinders of an engine varies not only with the speed of the engine, but also with the length of the intake pipe. That is, for a particular engine speed, manifold pressure, valve timing, etc., the weight of combustion fluid drawn into a cylinder of the engine while its intake port is open depends on the length of the intake pipe. This relationship is well known and is graphically illustrated in Fig. 5. In Fig. 5, curves A, B and C graphically illustrate the variation in the volumetric efficiency of an engine piston with engine speed for intake pipes of long, medium and short lengths, respectively. Thus, for an engine speed indicated by the dotted line D, the medium length intake pipe provides the maximum volumetric efficiency at that speed. Lower or higher engine speeds require longer or shorter lengths of intake pipes, respectively, for maximum volumetric efficiency, as indicated by the curves A and C.

Referring to Figs. 1-3, an internal combustion engine 10 comprises a pair of cylinder blocks 11 and 12 with an intake manifold chamber 13 disposed therebetween. Each of the cylinder blocks 11 and 12 comprises an inline row of cylinders having intake ports 14 controlled by engine operated valves 16 in the conventional manner. A supercharger 18 having an inlet nozzle 19 has its drive shaft 20 drivably connected to the engine 10 in a conventional manner by means not shown, and the supercharger discharges its output into a conduit or diffuser 22 which in turn discharges into the manifold chamber 13. From the manifold chamber 13 the combustion fluid is fed to the various engine cylinders through their intake pipes 24.

As illustrated, each of the intake pipes 24 has an outwardly flaring end 26 disposed within the chamber 13. In this way, the intake pipes may be made of proper length for maximum efficiency without any complicated branch manifold. The manifold chamber 13 is of sufficient cross sectional area that the pressure throughout the chamber remains substantially uniform. To this end the conduit 22 is of gradually increasing cross section, thereby providing a diffuser for converting the velocity head of the combustion fluid supplied therethrough from the supercharger into static pressure head. Also, the manifold chamber 13 should be of such size that during engine operation, the velocity of the combustion fluid throughout the manifold chamber is substantially less than the velocity of the combustion fluid flow through any of the intake pipes when its associated intake port is open.

As to the disposition of the intake pipes 24 within the manifold chamber 13, it is only necessary to avoid the effects of overlap of the intake strokes of the various cylinders by suitably locating and orienting the inlet ends of the intake pipes of the cylinders having overlapping intake strokes. Except for this limitation, the intake pipes may be disposed in any desired manner within the manifold chamber 13 in order to provide for their desired length.

As illustrated in Figs. 1 and 3, the engine manifold chamber 13 is disposed in the V-shaped space 28 between two radially disposed in-line rows of cylinders 11 and 12 by bolts 30. The diffuser conduit 22 opens into the bottom of the chamber 13 and the intake pipes 24 extend into the chamber from the cylinder blocks 11 and 12 disposed on opposite sides thereof. This construction is particularly applicable to an internal combustion engine having an even number of in-line cylinder rows. If the engine comprises an odd number of in-line cylinder blocks 31, a manifold chamber 32 is secured to each of said rows, as illustrated in Fig. 4. Furthermore, as previously mentioned, the intake pipes may be extended in various directions within the chamber 13 in order to obtain intake pipes of proper length; for example, in Fig. 4 the intake pipes 34 are curved outwardly.

With the manifold arrangement of either Figs. 1 to 3 or Fig. 4 each intake pipe may be made the proper length for a given engine speed by extending the intake pipe into the manifold chamber to provide the desired length. This feature is particularly useful in connection with internal combustion engines which operate at a substantially constant speed as, for example, aircraft engines in which the speed is maintained constant by automatic adjustment of the propeller pitch. Also, this manifold arrangement may be used with a carburetion induction system in which a combustion mixture of fuel and air is supplied to the manifold chamber 13 or 32, but preferably is used with a fuel injection system in which only combustion air is supplied to the manifold chamber, the fuel being discharged into the engine through conventional fuel injection nozzles.

The invention has been described in connection with an engine having one or more in-line rows of cylinders, but the invention may also be applied to a conventional radial cylinder engine 40 as illustrated in Fig. 6.

The engine 40 comprises a plurality of cylinders 42 radially disposed about a crankcase 44, and an engine driven supercharger 46 receives the combustion air or mixture from the carburetor 48 and discharges this combustion fluid into an annular manifold 50 from whence it is distributed to the various engine cylinders. This structure of the engine 40 is conventional.

The intake pipes branching out from the annular manifold 50 may extend into the manifold to provide intake pipes of the proper length. However, the distance between the annular manifold 50 and the intake ports of the cylinders 42 may be larger than the intake pipe length necessary for optimum volumetric efficiency of the engine cylinders. In this latter case feed pipes 52 of relatively large cross sectional area extending radially outward from the annular manifold 50 are provided for each of the cylinders 42, and intake pipes 54 of relatively small cross sectional area extend therein from the intake ports of the cylinders to provide proper length intake passages. The cross sectional area of the feed pipes 52 is sufficiently large such that the fluid pressure is substantially uniform throughout the feed pipes and the velocity of the combustion fluid throughout the feed pipes is substantially less than the velocity of this fluid through their associated intake pipes. With this arrangement the effective length of the flow path into the cylinders when their intake valves open is determined by the length of their associated intake pipes 54.

It is realized that the feed pipes 52 might be made of such length that the proper length intake pipes 54 would terminate flush with the outer ends of the feed pipes 52. However, since the length of the intake pipes depends on the engine speed for which they are designed, by extending the intake pipes into the manifold feed pipes 52 it is possible to standardize the size of the manifold feed pipes 52 for different engines even though the intake pipes 54 of one engine are designed for optimum cylinder volumetric efficiency at one engine speed and in another engine the intake pipes 54 are designed for optimum efficiency at a different engine speed. Also, it is entirely possible that the different cylinders of an engine might require intake pipes of different lengths for maximum volumetric efficiency because of the difference in the relative orientation of the engine cylinders or for other reasons, and therefore the extension of the intake pipes 54 into the feed pipes 52 has the further advantage that it facilitates the provision of intake pipes of different length.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an induction system for an internal combustion engine having a pair of in-line rows of cylinders disposed in side-by-side relation with a space therebetween, a manifold chamber within said space, and an intake pipe for each of the cylinders and extending therefrom into said manifold chamber, said chamber having a cross-sectional area sufficiently larger than that of the individual intake pipes in order that the pressure remains substantially uniform throughout said chamber.

2. In an induction system for a multi-cylinder internal combustion engine, a manifold chamber, a plurality of intake pipes each respectively establishing communication between the intake port of one of the engine cylinders and said chamber, each of said intake pipes extending into said chamber to an extent determined by the length of intake pipe desired, and a conduit for supplying combustion air to said manifold chamber, the cross-sectional area of said conduit increasing toward its discharge end, said manifold chamber having a cross-sectional area substantially larger than that of each intake pipe.

3. In an induction system for a multi-cylinder internal combustion engine, a manifold chamber, a plurality of intake pipes each respectively establishing communication between the intake port of one of the engine cylinders and said chamber, each of said intake pipes extending into said chamber to an extent determined by the length of intake pipe desired, and a feed conduit extending into said manifold chamber for supplying combustion air thereto, the cross-sectional area of said conduit increasing toward its discharge end within said chamber, said chamber having a cross-sectional area sufficiently larger than that of the individual intake pipes in order that the pressure remains substantially uniform throughout said chamber.

4. In an induction system for a multi-cylinder internal combustion engine, a manifold chamber, a conduit opening into said chamber, a supercharger for supplying combustion air to said chamber through said conduit, the cross-sectional area of said conduit increasing at its discharge end in the direction of the flow therethrough to provide a diffuser for the supercharger, and a plurality of intake pipes each respectively establishing communication between the intake port of one of the engine cylinders and said chamber, each of said intake pipes extending into said chamber to an extent determined by the length of pipe desired, said chamber having a cross-sectional area sufficiently larger than that of the individual intake pipes in order that the pressure remains substantially uniform throughout said chamber.

5. In an induction system for an internal combustion engine having an in-line row of cylinders, a longitudinal manifold chamber disposed adjacent to and along said row of cylinders, a conduit projecting into said chamber and being disposed therein along the side of said chamber adjacent to the base of said row of cylinders, a supercharger for supplying combustion air to said chamber through said conduit, and a plurality of intake pipes each respectively establishing communication between the intake port of one of the engine cylinders and said chamber, each of said intake pipes projecting into said chamber to an extent determined by the length of intake pipe desired, said chamber having a cross-sectional area sufficiently larger than that of the individual intake pipes in order that the pressure remains substantially uniform throughout said chamber.

6. In an induction system for an internal combustion engine having a plurality of radially disposed cylinders comprising an annular induction manifold to which combustion air is supplied, an intake pipe for each engine cylinder, and a plurality of feed pipes each of substantially larger cross-sectional area than said intake pipes, each of said feed pipes being interposed between one of said intake pipes and said induction manifold with said intake pipes extending a substantial distance into their associated feed pipes.

7. In an induction system for a multi-cylinder internal combustion engine, a manifold chamber to which air for engine combustion is supplied, and a plurality of intake pipes each respectively establishing communication between one of said engine cylinders and said chamber, and each extending a substantial distance into said chamber, said chamber having a cross-sectional area substantially larger than that of each intake pipe.

8. In an induction system for a multi-cylinder internal combustion engine, a manifold chamber to which air for combustion is supplied, and a plurality of intake pipes each respectively establishing communication between one of said engine cylinders and said chamber, said chamber having a cross-sectional area substantially larger than that of the individual intake pipes whereby the pressure is substantially uniform throughout said chamber, said intake pipes extending into said chamber to provide the desired pipe lengths.

9. In an induction system for a multi-cylinder internal combustion engine, a manifold chamber to which air for combustion is supplied, and a plurality of intake pipes each respectively establishing communication between one of said engine cylinders and said chamber, said chamber having a cross-sectional area sufficiently larger than that of the individual intake pipes in order that the pressure remains substantially uniform throughout said chamber during engine operation and in order that the air velocity within said chamber is substantially less than the velocity through the intake pipes, said intake pipes extending into said chamber to provide the desired pipe length.

10. In an induction system for a multi-cylinder internal combustion engine, a manifold chamber to which fluid for combustion is supplied, and a plurality of intake pipes each respectively establishing communication between one of said engine cylinders and said chamber, said chamber having a cross-sectional area sufficiently larger than that of the individual intake pipes in order that the fluid pressure remains substantially uniform throughout said chamber during engine operation, said intake pipes extending into said chamber to an extent to provide intake pipes of such length that a amaximum quantity of combustion fluid enters each cylinder.

11. In an induction system for an internal combustion engine having a plurality of radially disposed cylinders, a manifold chamber to which fluid for combustion is supplied, and a plurality of intake pipes each respectively establishing communication between one of said engine cylinders and said chamber, said chamber having a cross-sectional area sufficiently larger than that of the individual intake pipes whereby the fluid pressure remains substantially uniform through-said chamber during engine operation, said intake pipes each extending a substantial distance into said chamber.

WILTON G. LUNDQUIST.
ELDEN H. OLSON.